(12) United States Patent
Friedberger et al.

(10) Patent No.: US 8,872,187 B2
(45) Date of Patent: Oct. 28, 2014

(54) MEMBRANE HAVING MEANS FOR STATE MONITORING

(75) Inventors: Alois Friedberger, Oberpframmern (DE); Andreas Helwig, München (DE); Gerhard Mueller, Grafing (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/302,629

(22) Filed: Nov. 22, 2011

(65) Prior Publication Data
US 2012/0126248 A1 May 24, 2012

Related U.S. Application Data

(63) Continuation of application No. PCT/EP2010/003072, filed on May 19, 2010.

(30) Foreign Application Priority Data

May 27, 2009 (DE) .................. 10 2009 022 913

(51) Int. Cl.
| | | |
|---|---|---|
| *H01L 29/84* | (2006.01) | |
| *B01D 67/00* | (2006.01) | |
| *B01D 69/02* | (2006.01) | |
| *B01D 65/10* | (2006.01) | |
| *G01M 3/40* | (2006.01) | |

(52) U.S. Cl.
CPC .......... *B01D 65/102* (2013.01); *B01D 67/0023* (2013.01); *B01D 69/02* (2013.01); *B01D 2325/26* (2013.01); *G01M 3/40* (2013.01)
USPC .............. 257/77; 257/E29.082; 257/E29.084; 257/E29.089; 257/E29.324; 257/40; 257/98; 426/580; 210/650; 428/690; 73/38

(58) Field of Classification Search
CPC ............ H01L 51/0037; H01L 51/0042; H01L 51/0003; H01L 51/0043; H01L 51/5052; B01D 69/02
USPC .................. 257/E29.082, E29.084, E29.089, 257/E29.324, 76, 77, 415; 210/650
See application file for complete search history.

(56) References Cited

U.S. PATENT DOCUMENTS

| | | |
|---|---|---|
| 3,278,881 A | 10/1966 | Burton et al. |
| 6,541,676 B1 | 4/2003 | Franz et al. |

(Continued)

FOREIGN PATENT DOCUMENTS

| | | |
|---|---|---|
| CN | 1976746 | 6/2007 |
| DE | 600 37 130 | 7/2000 |

(Continued)

OTHER PUBLICATIONS

Bergmann, W, Werkstofftechnik—Teil 2: Anwendung, 1991, p. 278, No. 2, Hanser, Munich/Vienna.

(Continued)

*Primary Examiner* — Jerome Jackson, Jr.
*Assistant Examiner* — Bo Fan
(74) *Attorney, Agent, or Firm* — Jenkins, Wilson, Taylor & Hunt, P.A.

(57) ABSTRACT

The invention relates to a membrane. Partly permeable membranes often have holes or perforations having a specific diameter to allow substances having a smaller particle diameter to pass through, but to hold back substances having a larger particle diameter. Such membranes are subject to wear primarily at the holes, i.e. cracks form which grow through the membrane proceeding from a hole. Particularly in the case of micromechanical membranes having holes having a small diameter in the range of 1 μm or less, it is very difficult to detect the state of the membrane, in particular whether the latter has cracks. Membranes having cracks can then undesirably allow passage even of those particles which should actually be held back. In medical or hygienic applications, the function can then be impaired.

9 Claims, 4 Drawing Sheets

(56) References Cited

U.S. PATENT DOCUMENTS

2005/0109081 A1    5/2005  Zribi et al.
2008/0248182 A1* 10/2008  Jongsma et al. ............. 426/580

FOREIGN PATENT DOCUMENTS

| | | |
|---|---|---|
| DE | 199 26 372 | 2/2001 |
| DE | 10 2005 001 098 | 1/2005 |
| DE | 10 2004 030 380 | 1/2006 |
| EP | 1 441 209 | 7/2004 |
| EP | 1612531 | 1/2006 |
| EP | 1 214 744 | 11/2007 |
| WO | WO 0108227 | 2/2001 |
| WO | WO 2005/105276 | 11/2005 |
| WO | WO 2010/136148 | 12/2010 |

OTHER PUBLICATIONS

International Search Report for Application No. PCT/EP2010/003072 dated Sep. 10, 2010.
Chinese Search Report for Application No. 201080023433.9 dated May 19, 2010.

\* cited by examiner

MEMBRANE HAVING MEANS FOR STATE MONITORING

CROSS-REFERENCE TO RELATED APPLICATIONS

This application is a continuation of and claims priority to PCT/EP2010/003072 filed May 19, 2010 which claims the benefit of and priority to German Patent Application No. 10 2009 022 913.2 filed May 27, 2009, the entire disclosures of which are incorporated by reference herein in their entireties.

FIELD OF THE INVENTION

The invention relates to a membrane. The application of impermeable or partly permeable membranes in the art are diverse. Partly permeable membranes, in particular, often have holes or perforations having a specific diameter in order to allow substances having a smaller particle diameter to pass through, but to hold back substances having a larger particle diameter. Such membranes are subject to wear primarily at the holes, i.e. cracks form which grow through the membrane proceeding from a hole. Particularly in the case of micromechanical membranes having holes having a small diameter in the range of 1 µm or less, it is very difficult to detect the state of the membrane, in particular whether the latter has cracks. Membranes having cracks can then undesirably allow passage even of those particles which should actually be held back. Precisely in applications in the medical or hygienic field, the function can then be impaired. By way of example in the case of a water filter which should hold back bacteria having a particle diameter of approximately 1 µm by means of a hole diameter of 450 nm, said bacteria would be able to pass through in the case of a crack between adjacent holes. On account of the small structure size, it is difficult to ascertain such microscopic cracks.

SUMMARY

Therefore, it is an object of the invention to provide a membrane whose state can be ascertained. The intention, therefore, is to be able to reliably ascertain in particular cracks or other function-impairing locations of damage.

According to the invention, this object is achieved by means of the features specified in claim 1. Advantageous developments emerge from the dependent claims.

The invention makes it possible to monitor the state of the membrane (that is to say whether the latter is functional or intact) by detecting the electric current through the at least one conductor track. For this purpose, the at least one membrane is covered with one or more conductor tracks at least at the regions particularly at risk of cracking, or else over the entire membrane area. For this purpose, said conductor tracks are made very thin and sensitive, in order that they are immediately interrupted if the crack reaches them.

If a crack has formed, above a certain size or extent it will therefore reach and sever the conductor track. Thus, no or almost no current flows anymore and a fault message can be output. The state of the membrane can also be monitored by means of a detection system in accordance with DE 10 2004 030 380 A1.

Preferably, a single conductor track will be provided, which at least partly or else completely covers the membrane surface in a meandering or loop-like manner. It is possible to provide a uniform spacing of the individual conductor track loops or closer guidance at jeopardized locations. It is also possible to provide a plurality of conductor tracks electrically connected in parallel. Outside the membrane region, contacts are provided which communicate with the conductor track and via which a detection system is electrically contact-connected to the conductor track. For this purpose, resilient contact pins are suitable, in particular, which are protected against the liquid medium by a sealing ring running over the conductor track.

Preferably, the at least one conductor track has a thickness of 10-1000 nm, preferably 20-100 nm. This ensures that the conductor track does not offer significant resistance to crack propagation, which could otherwise lead to crack propagation along the (parallel to the) conductor track, as a result of which a crack could grow without this being detected.

Preferably, the at least one conductor track has a width of 50 nm-100 µm, preferably 100 nm-500 nm. This makes it possible to arrange the conductor track between the often closely arranged holes in a membrane.

Preferably, the at least one conductor track is provided with a passivation layer, preferably composed of $SiO_2$, $Si_3N_4$, diamond or diamond-like layers, polymers such as polycarbonate or SiC. This ensures that it is not attacked by the medium flowing around the membrane, as a result of which incorrect indications are avoided.

One preferred development of the invention provides for at least one conductor track to be arranged on both sides of the membrane. This either enables a more generous arrangement of each of the two conductor tracks without impairment of the monitoring function. It is expedient in this case if the conductor tracks on both sides run more or less transversely with respect to one another and, in this way, for example, by means of two conductor track rows which are simple to produce and which each consist of parallel conductor track sections, but the conductor track sections of both sides are perpendicular to one another, it is possible to form a close-meshed conductor track network. This is advantageous particularly if regularly arranged holes are to be closely enclosed.

Alternatively, a membrane having a number of holes can also be provided with a conductor track which nestles around the holes like a wavy line or in an undulatory manner.

An alternative embodiment provides, in the case of a membrane having holes, for the conductor track to have a larger width than the holes. Such a membrane will be produced the most expediently by firstly providing the at least one conductor track on the membrane and subsequently forming the holes. The arrangement of the holes can then be effected relatively arbitrarily with respect to the course of the conductor track, since even the arrangement of holes directly in the conductor track regions does not lead to an interruption thereof. Alternatively, it is possible firstly to form the holes, and only then the conductor track. Particularly in the case of small hole diameters, the disturbing influence thereof on further production processes is even smaller and it is possible, even after the formation of the holes, to apply the conductor track and to pattern it photolithographically or in some other way.

Another preferred development of the invention provides for the membrane to consist of a material which can be made conductive by targeted n- and/or p-type doping (basic doping), and the at least one conductor track is formed as targeted doping (in contrast to the basic doping) of the membrane at the locations where the at least one conductor track is intended to run. Suitable materials are, in particular, semiconductors such as silicon, germanium, GaN, GaAlN, diamond or diamond-like layers or SiC.

A number of methods are possible for the production of a membrane according to the invention. The three required steps: (a) producing membrane, (b) producing holes, (c)

applying conductor tracks can be performed successively in any desired order, but the order (c) (b) (a) is particularly preferred.

BRIEF DESCRIPTION OF THE DRAWINGS

The invention will be explained further with reference to the accompanying drawings, in which.

DETAILED DESCRIPTION

FIGS. 1 to 4 illustrate four different embodiments of membrane arrangements 10a-10d each consisting of one conductor track 20a-20d. In these exemplary embodiments, the membrane arrangements each comprise a silicon chip 14 made from 5×5 mm of monocrystalline silicon having a membrane thickness of 1 µm. The dashed rectangles define the actual membrane region 16, in which a number of holes 18 are arranged. In these preferred exemplary embodiments, the holes each have a diameter of approximately 450 nm. Smaller or significantly larger holes can also be provided.

Figure 1:
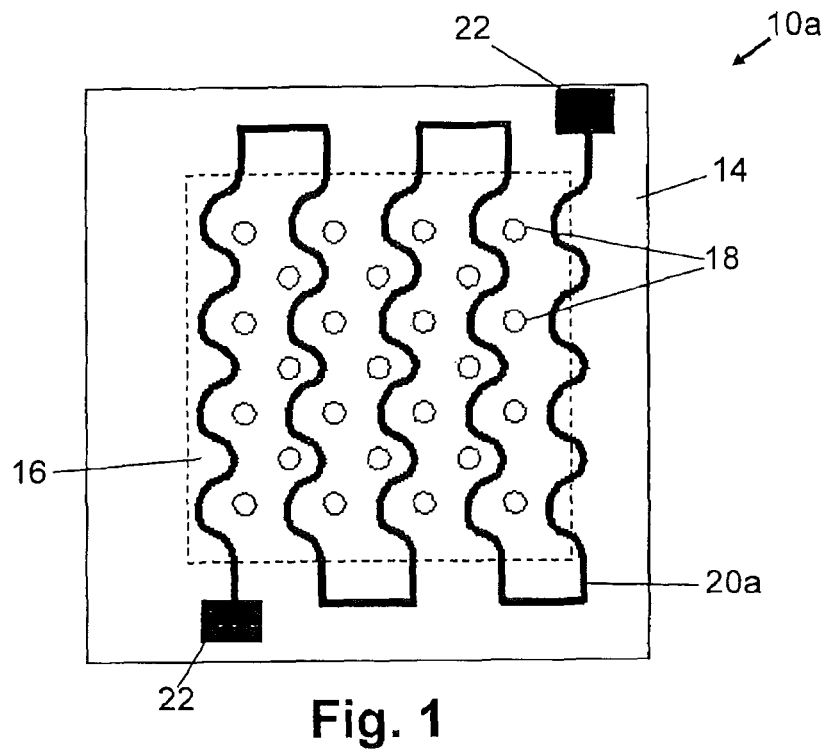
FIG. 1: shows a first embodiment of a membrane with a conductor track.

In the embodiment in accordance with FIG. 1, a conductor track 20a extends substantially over the entire area of the membrane region 16, to be precise in a meandering or wavy manner in adaptation to the holes 18. Contacts 22 are provided at both ends on the conductor track 20a, via which contacts a detection device (not shown) can be connected to the conductor track 20a. Preferably, said detector device measures the electrical resistance of the conductor track 20a. In the case of cracking, the crack will at some point reach the conductor track 20a and sever the latter. Thus, the electrical resistance of the conductor track 20a rises, which can be ascertained by the detector device. The latter can, for example, generate a warning signal or else deactivate the device provided with the membrane.

Figure 2:
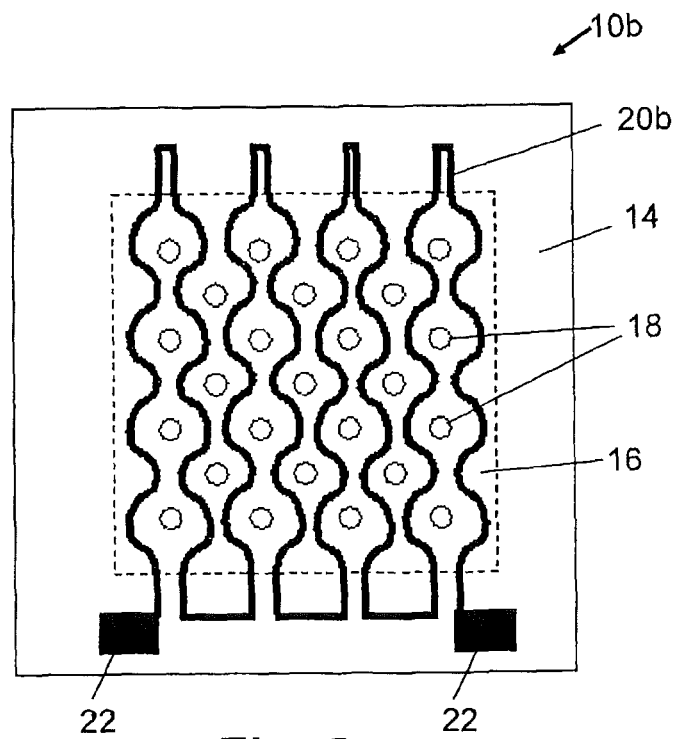
FIG. 2: shows a second embodiment of a membrane with a conductor track.

The embodiment in accordance with FIG. 2 is very similar to that from FIG. 1 and differs from the embodiment in accordance with FIG. 1 only in that the conductor track 20b runs in narrower loops and thus nestles closer to the holes 18, such that even upon incipient cracking, that is to say at an earlier point in time than in the case of the embodiment in accordance with FIG. 1, the membrane state can be ascertained as damaged.

Figure 3:
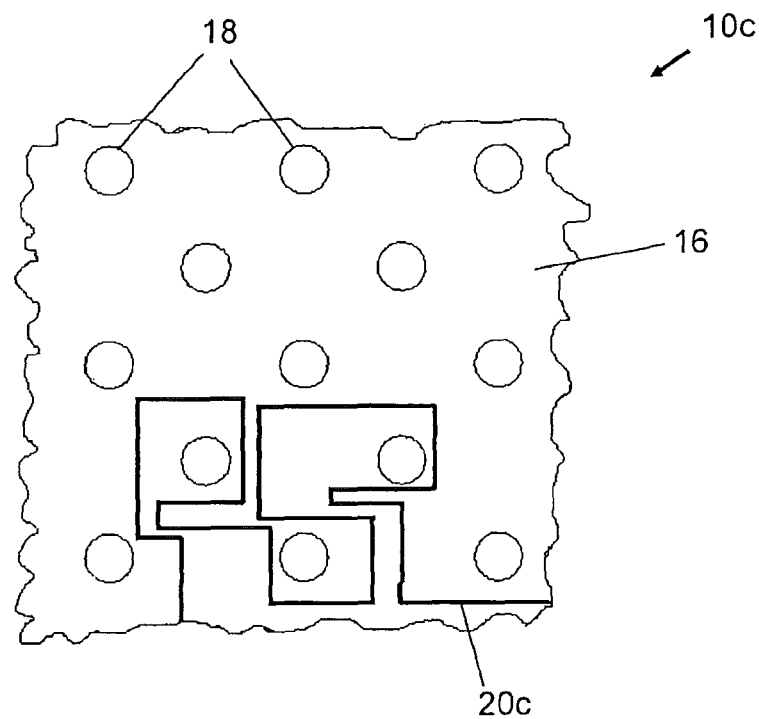
FIG. 3: shows an excerpt from a third embodiment of a membrane with a conductor track.

FIG. 3 shows an embodiment 10c wherein the conductor track 20c is arranged in such a way that the holes 18 are individually completely enclosed, such that cracking between adjacent holes 18 inevitably leads to crack detection. A relatively complex course of the conductor track 20c is required in this case.

Figure 4:
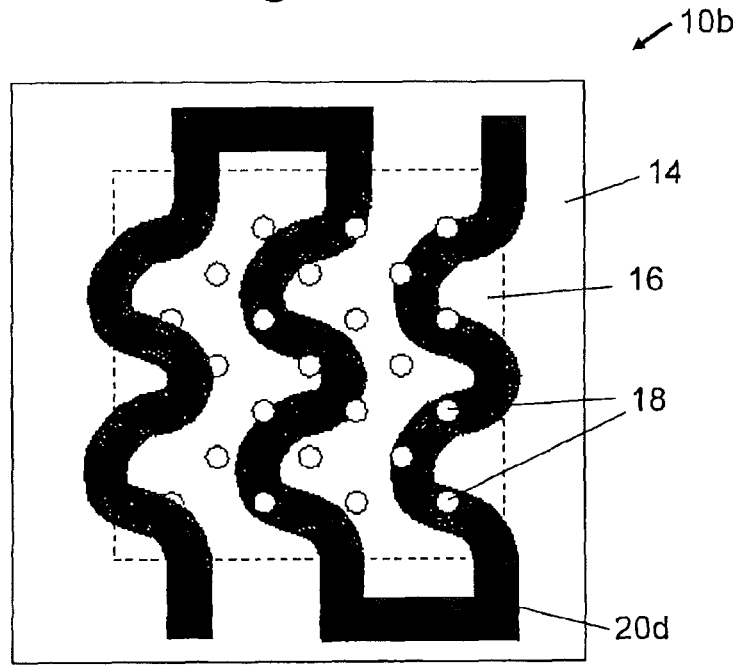
FIG. 4: shows a fourth embodiment of a membrane with a conductor track.

FIG. 4 shows a different embodiment 10d, wherein the conductor track 20d has a significantly larger width than the diameters of the holes 18. In the case of this embodiment, the conductor track 20d can be chosen independently of the hole arrangement 18. Production is therefore simpler because the conductor track 20d does not have to be precisely adapted to the arrangement of the holes 18.

Production can preferably be effected by firstly applying the conductor track 20d on the membrane 16 and only afterward producing the holes 18. This is because even if individual holes 18 fall completely into the conductor track 20d, the latter remains conductive. In this case, the width of the conductor track 20d should be significantly greater than the diameter of the holes 18, preferably at least 150% of the hole diameter, in order that the conductor track 20d is not already interrupted inadvertently during production. The conductor track 20d will preferably be arranged in narrow loops in order that the non-covered regions with holes are as small as possible.

Figure 5:
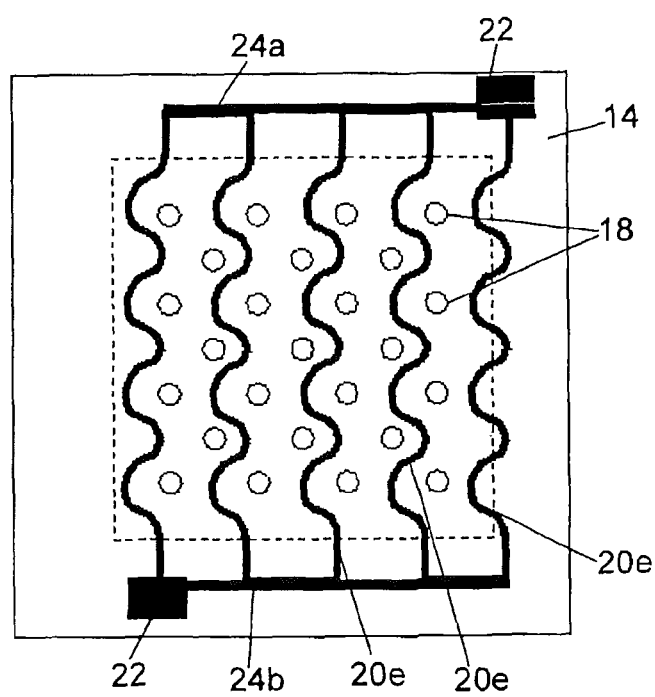
FIG. 5: shows an embodiment of a membrane with a plurality of conductor tracks connected in parallel.

The embodiment in accordance with FIG. 5 substantially corresponds to that from FIG. 1 with the difference that a plurality of conductor tracks 20e in parallel in terms of circuit technology are provided, which lead to bus lines 24a, 24b connected at the contacts 22. In this variant, the individual conductor tracks 20e have to have a predetermined conduction resistance, because only the change in the total resistance is measurable as a fault. Therefore, it is expedient if not too many parallel conductor tracks 20e are provided (preferably not more than about 5), because then the detection of an interruption becomes more problematic from a metrological standpoint, since the resistance then changes only insignificantly (parallel connection of resistances) if one of the parallel conductor tracks 20e is interrupted.

Figure 6:
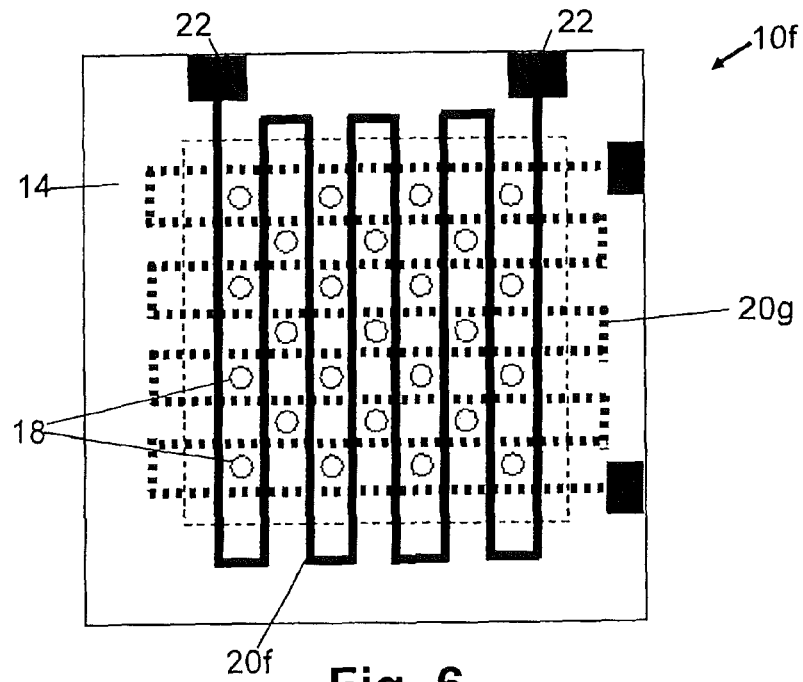
FIG. 6: shows an embodiment with two conductor tracks running transversely with respect to one another.

FIG. 6 shows an embodiment 10f wherein the holes 18 are surrounded by two conductor tracks 20f, 20g, wherein these two conductor tracks 20f, 20g run transversely, preferably perpendicularly, with respect to one another and thus enclose in particular each hole 18 individually. The two conductor tracks 20f, 20g can, as illustrated in FIG. 6, be connected up separately or else electrically connected in series or parallel. The two conductor tracks 20f, 20g can be fitted on different sides of the membrane 14 or else on the same side and be isolated from one another by means of a thin electrically non-conducting intermediate layer.

Figure 7:
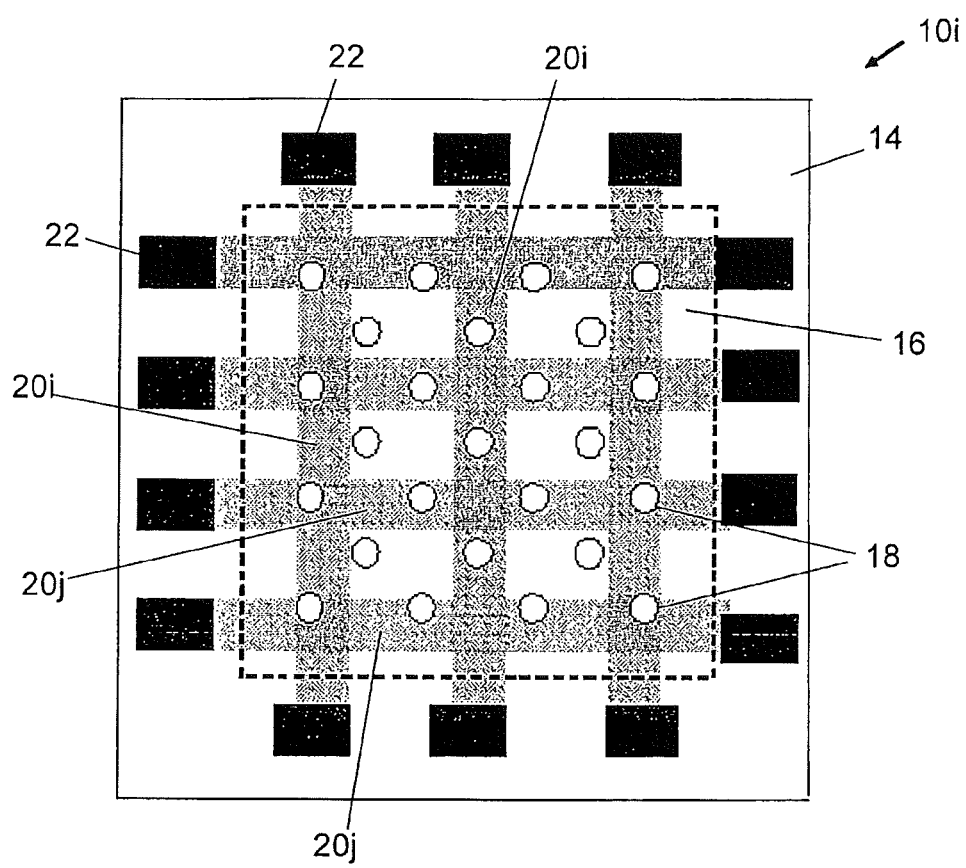
FIG. 7: shows an embodiment with a conductor track formed by doping.

FIG. 7 shows an embodiment 10i wherein tracks 20i and 20j of n- or p-doped semiconductors are formed into a membrane composed of a semiconductor such as silicon, diamond, SiC, GaN, GaAlN or germanium, which tracks are thus conductive and—as shown in FIG. 7—can be individually contact-connected or else connected to one another similarly to the embodiments in accordance with the previous drawings. In the case of the embodiment shown in FIG. 7, in a manner similar to that in the case of FIG. 4, the conductor tracks 20i, 20j are wider than the hole diameter, which simplifies production. Alternatively, the conductor tracks can also be made thinner and arranged similarly to FIG. 1, 2, 3, 5 or 6. Thus, n- and/or p-conductive regions can be produced which are insulated from one another on account of space charge zones by virtue of blocking pn junctions. Depending on the width of the conductor tracks 20i, 20j, either a complete loss of conductivity or a significant rise in resistance occurs. The conductivity of the conductor tracks 20i, 20j can be varied by suitable doping. The sensitivity of crack detection can thereby be adapted.

The invention is suitable, in particular, for applications for biosensor technology or purifying fluids, without this being restrictive. The invention can be applied to structures having a very large area, since suitable production methods such as laser structuring are available therefore.

The invention claimed is:

1. A membrane, comprising at least one conductor track for current flow and which is interruptible upon damage to the membrane, and wherein a state of the membrane being determinable by detecting an electric current through the at least one conductor track, wherein the membrane comprises a plurality of holes and the at least one conductor track has a width larger than a diameter of each of the number of holes, such that at least a portion of the plurality of holes falls completely into the at least one conductor track.

2. The membrane as claimed in claim 1, characterized in that the at least one conductor track is arranged in a loop-like manner on the membrane and substantially covers the latter.

3. The membrane as claimed in claim 1, characterized in that the at least one conductor track has a thickness of 10 nm-100 µm, preferably 20 nm-500 nm.

4. The membrane as claimed in claim 1, characterized in that the at least one conductor track has a width of 50 nm-100 µm, preferably 100 nm-500 nm.

5. The membrane as claimed in claim 1, characterized in that the at least one conductor track is provided with a passivation layer.

6. The membrane as claimed in claim 1, characterized in that the at least one conductor track is arranged in a meandering manner.

7. The membrane as claimed in claim 1, characterized in that the membrane consists of a material which can be made conductive by targeted n- or p-type doping, and the at least one conductor track is formed as regional doping of the membrane.

8. The membrane as claimed in claim 7, characterized in that the membrane consists of silicon, germanium, GaN, GaAlN, diamond, diamond-like material or SiC.

9. A method for producing a membrane, comprising:
   providing to the membrane at least one conductor track for current flow and which is interruptible upon damage to the membrane, wherein a state of the membrane is determinable by detecting an electric current through the at least one conductor track; and
   producing a plurality of holes in the membrane, wherein the at least one conductor track has a width larger than a diameter of each of the holes, such that at least a portion of the plurality of holes falls completely into the at least one conductor track.

\* \* \* \* \*